Nov. 20, 1934.  H. VOLGER  1,981,682
MACHINE TOOL
Filed Dec. 3, 1931
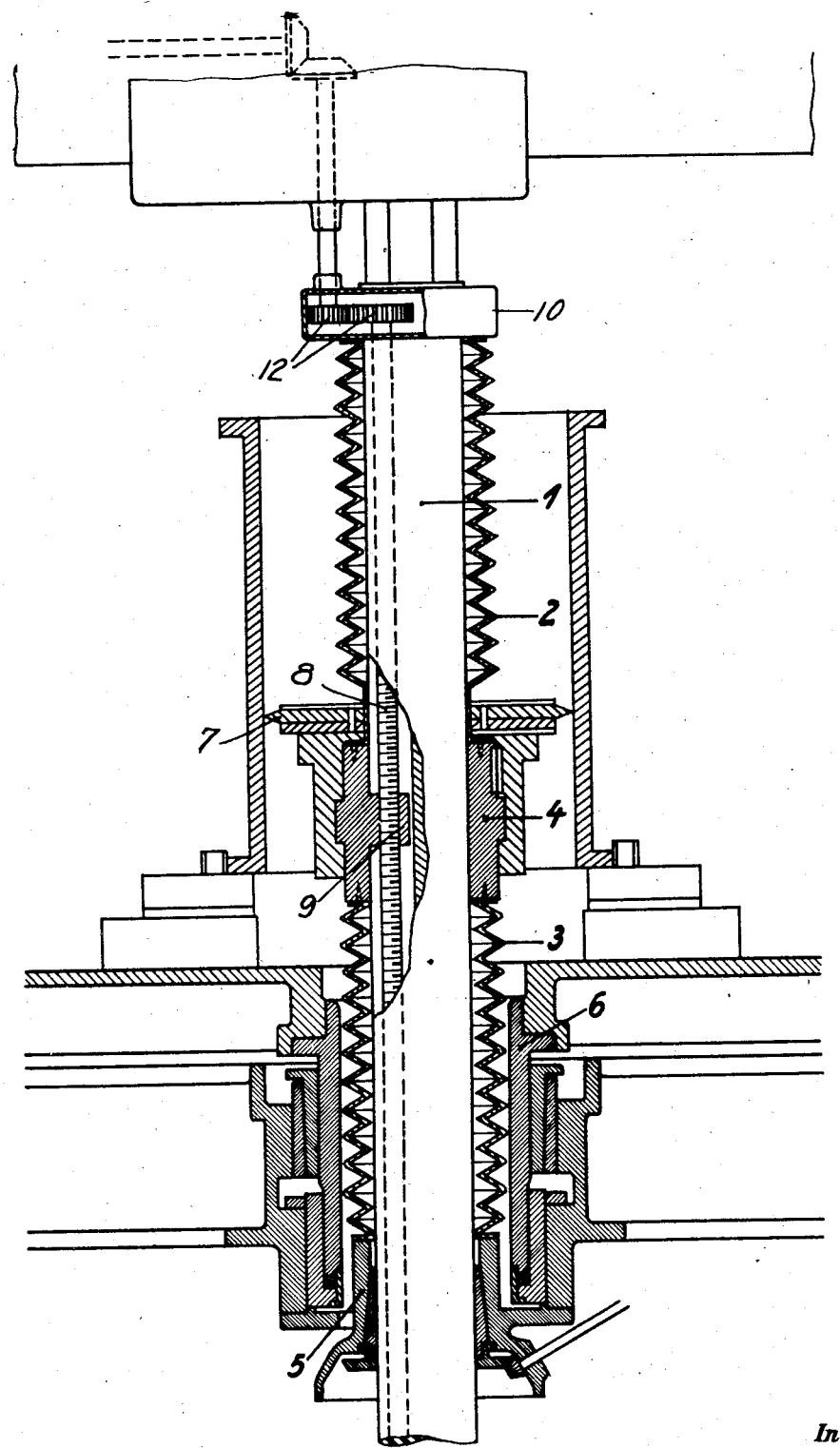
Inventor
H. Volger:
by
W. E. Evans
Attorney.

Patented Nov. 20, 1934

1,981,682

UNITED STATES PATENT OFFICE 1,981,682

MACHINE TOOL

Hermann Vogler, Dusseldorf, Germany, assignor to Schiess-Defries Aktiengesellschaft, Dusseldorf, Germany Application December 3, 1931, Serial No. 578,726
In Germany September 26, 1930

1 Claim. (Cl. 77—4)

Boring rods provided with moving boring head such as are employed, for example, on vertical lathes and cylinder boring machines for boring long cylinders, are provided with one or two screw-threaded spindles for effecting the traverse of the boring head, which spindles are inserted into the boring rod.

The grooves or channels in the boring rod which accommodate the screw-threaded spindles become very quickly choked with turnings which affect the forward movement of the boring head and may even stop the movement of the screw-threaded spindles and cause premature wear. Furthermore the expensive boring rod itself is affected by the small dust-like turnings which are produced, particularly when cast iron is being worked. These small turnings hinder the forward movement of the boring head and cause the boring rod to wear.

According to the invention each of the exposed parts of the boring rod which lie on the two sides of the boring head is enclosed in a sheath or covering of an elastic material which can be collapsed and extended in the axial direction, the ends away from the boring head being secured with a tight joint against a shoulder or flange on the boring rod in the one case and in the other case against a guiding sleeve embracing the boring rod and disposed within the main spindle of the work table, which spindle is provided hollow.

It is known to surround the screw-threaded spindles of machine tools that are adapted to effect the traverse of a slide or the like by means of telescopically collapsible tubes but since there are present a number of surfaces sliding one upon the other particles of dust may penetrate between the surfaces after the machine has been running for only a short time, and thus the protection afforded by the tubes is largely nullified. It has furthermore been proposed to employ bellows in concertina form for covering the guiding tracks. These devices do not provide perfect protection because it is necessary specially to cover any surfaces which move one upon the other and towards each other, but this is not possible in practice.

One form of the device according to the invention is diagrammatically illustrated in the accompanying drawing in longitudinal section.

In the drawing, 1 is the stationary boring rod, along which the boring head 4, carrying the cutting tools 7, is provided to move axially, but without rotation. The boring head 4 is traversed by means of a screw-threaded spindle 8 which lies in a channel in the boring rod 1 and is embraced by a feed nut 9 carried by the boring head 4. The screw-threaded spindle 8 is rotated by means of the toothed wheels 12 mounted in the upper flanged end 10 of the boring rod, the gear wheels 12 being rotated by the bevel wheels shown in the head 13. The upper flanged end 10 of the boring rod 1 has secured to it a collapsible protecting sheath 2 of leather or other suitable elastic material, which is in concertina form and surrounds the boring rod, being secured at the bottom to the upper end of the boring head. A second similarly formed protecting sheath 3, which is secured to the lower end face of the boring head 4 and at its lower end to an immovable sleeve 5 surrounding the boring rod 1 and serving as a tight closure to the lower end of the sleeve 3.

To render this construction possible the main spindle 6 of the table 14 is provided of an internal diameter such that an annular space is left around the boring rod 1 to enable the concertina like enclosing sheath to be received therein.

I claim:

A device for protecting the stationary boring rod of vertical lathes, in which the work rotates upon a table and the boring rod carries an axially movable boring head, comprising sheaths of elastic material in the form of continuous jackets of the material adapted to collapse after the manner of a bellows and to extend respectively over the exposed parts of the boring rod lying at the two sides of the boring head, and an immovable sleeve closely fitting around the lower end of the boring rod, the said sheaths being secured at the one end to the boring head and the upper sheath being secured at the upper end to the head of the boring rod, and the lower sheath being secured at the lower end to the immovable sleeve, in combination with a work table supporting spindle of hollow construction affording an annular space around the boring rod, in which space is disposed the immovable sleeve and the lower sheath and into which the boring head may enter.

HERMANN VOGLER.